US005769929A

United States Patent [19]
Gundlach et al.

[11] Patent Number: 5,769,929
[45] Date of Patent: Jun. 23, 1998

[54] INK COMPOSITIONS FOR THERMAL INK JET PRINTING

[75] Inventors: Kurt B. Gundlach; Luis A. Sanchez; Cheryl A. Hanzlik, all of Fairport; Kathy-Jo Brodsky, Palmyra; Richard L. Colt; Aileen M. Montes, both of Rochester, all of N.Y.

[73] Assignee: Xerox Corporation, Stamford, Conn.

[21] Appl. No.: 961,637

[22] Filed: Oct. 31, 1997

[51] Int. Cl.⁶ .................................................. C09D 11/02
[52] U.S. Cl. .................................. 106/31.27; 106/31.43
[58] Field of Search ............................ 106/31.43, 31.27

[56] References Cited

U.S. PATENT DOCUMENTS

| | | | |
|---|---|---|---|
| 3,948,668 | 4/1976 | Hayek et al. | 106/31.59 |
| 4,761,180 | 8/1988 | Askeland et al. | 106/22 |
| 4,786,327 | 11/1988 | Wenzel et al. | 106/22 |
| 4,810,292 | 3/1989 | Palmer et al. | 106/23 |
| 4,880,565 | 11/1989 | Rose et al. | 106/31.43 |
| 5,019,166 | 5/1991 | Schwarz | 106/22 |
| 5,026,425 | 6/1991 | Hindagolla et al. | 106/22 |
| 5,156,675 | 10/1992 | Breton et al. | 106/31.58 |
| 5,342,439 | 8/1994 | Lauw | 106/22 H |
| 5,389,133 | 2/1995 | Gundlach et al. | 106/22 H |
| 5,401,303 | 3/1995 | Stoffel et al. | 106/20 R |
| 5,531,815 | 7/1996 | Bundlach et al. | 106/20 R |
| 5,540,765 | 7/1996 | Gundlach et al. | 106/20 R |
| 5,560,766 | 10/1996 | Gundlach | 106/31.27 |
| 5,560,770 | 10/1996 | Yatake | 106/31.58 |
| 5,690,722 | 11/1997 | Pawlowski | 106/31.86 |

*Primary Examiner*—Helene Klemanski
*Attorney, Agent, or Firm*—Judith L. Byorick

[57] ABSTRACT

Disclosed is an ink composition which comprises water, an anionic dye having at least one anionic functional group and having a cationic counterion associated with each anionic functional group, and a material of the formula $[(F_{2n+1}C_nCH_2S)_2(CH_3)C-CH_2CH_2COO-][B+]$, wherein n is an integer of from about 8 to about 20 and B is a cation, said ink composition containing alkali metal cations in an amount of no more than about $1 \times 10^{-3}$ moles per liter. Also disclosed are ink jet printing processes employing the aforementioned ink.

10 Claims, No Drawings

INK COMPOSITIONS FOR THERMAL INK JET PRINTING

BACKGROUND OF THE INVENTION

The present invention is directed to ink compositions and to processes for the preparation and use thereof. More specifically, the present invention is directed to compositions suitable for use in ink jet printing processes. One embodiment of the present invention is directed to an ink composition which comprises water, an anionic dye having at least one anionic functional group and having a cationic counterion associated with each anionic functional group, and a material of the formula $[(F_{2n+1}C_nCH_2S)_2(CH_3)C-CH_2CH_2COO-][B+]$, wherein n is an integer of from about 8 to about 20 and B is a cation, said link composition containing alkali metal cations in an amount of no more than about $1 \times 10^{-3}$ moles per liter.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

U.S. Pat. No. 5,019,166 (Schwarz), the disclosure of which is totally incorporated herein by reference, discloses a thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions disclosed herein to be ejected from a thermal ink jet printer in imagewise fashion onto a substrate.

U.S. Pat. No. 5,401,303 (Stoffel et al.), the disclosure of which is totally incorporated herein by reference, discloses a process wherein the halo effect seen at the interface between a first ink, exhibiting sharp edge acuity, and a second ink, having low surface energy, is addressed by adding certain fluorocarbon compounds to the first ink. Edge acuity of the first ink is maintained.

U.S. Pat. No. 5,540,765 (Gundlach et al.), the disclosure of which is totally incorporated herein by reference, discloses a thermal ink jet printing composition which contains a surfactant comprising an alkylsulfoxide having an alkyl group of 4 to 6 carbon atoms. Preferably, the composition contains a betaine zwitterionic base and dibutylsulfoxide.

U.S. Pat. No. 5,531,815 (Gundlach et al.), the disclosure of which is totally incorporated herein by reference, discloses a thermal ink jet printing composition contains a betaine zwitterionic base and a quasisurfactant penetrant.

U.S. Pat. No. 5,389,133 (Gundlach et al.), the disclosure of which is totally incorporated herein by reference, discloses a process for preparing an aqueous ink composition which comprises adjusting the pH of the ink with phosphorous acid or phosphite salts. Also disclosed are ink compositions prepared by this process. In certain preferred embodiments, the ink compositions can also contain betaine, sulfolane, dimethyl sulfoxide, or N,N'-bis(3-aminopropyl)1, 2-ethylenediamine, as well as mixtures thereof. In other preferred embodiments, the ink composition comprises an organic component selected from the group consisting of sulfolane, dimethyl sulfoxide, and mixtures thereof, and anions selected from the group consisting of phosphite, hypophosphite, phosphate, polyphosphate, sulfate, hexafluorophosphate, glycolate, acetate, ethylenediaminetetraacetate, formate, borate, sulfite, sulfamate, and mixtures thereof.

U.S. Pat. No. 4,810,292 (Palmer et al.), the disclosure of which is totally incorporated herein by reference, discloses an aqueous based ink composition for use in ink jet printers. The composition comprises (a) a vehicle of about 5 to 95 percent water and the balance at least one glycol ether, such as diethylene glycol; (b) a dye, such as Food Black 2, having at least one negatively charged functional group per molecule, present in an amount up to about 10 percent of the vehicle composition; and (c) a cationic compound selected from the group consisting of alkanol ammonium compounds and cationic amide compounds, present in an amount such that there is at least one molecule of cationic compound for at least one of the negatively charged functional groups on the dye, the pH of the ink composition being maintained in the acidic region below about 7. The ink composition evidences minimal crusting and reduced evaporation loss of water. The solubility of anionic dyes is increased in the acidic medium over that otherwise obtainable because of the presence of the alkanol ammonium or amide.

U.S. Pat. No. 4,761,180 (Askeland et al.), the disclosure of which is totally incorporated herein by reference, discloses inks used in ink jet printing which comprise a vehicle and a dye. The dye is typically an anionic dye, associated with undesirable cations such as sodium or potassium cations. Several properties of the inks are improved by replacing at least about one-fourth of such cations on the anionic dye with tetramethylammonium cations.

U.S. Pat. No. 4,786,327 (Wenzel et al.), the disclosure of which is totally incorporated herein by reference, discloses a process for reducing the crusting propensity of dyes, complexed with sodium or other cations, used in ink jet printheads and for improving other properties of such dyes. The process comprises replacing at least a portion of the cations on such dyes with preselected cations, such as those of the alkali metals lithium and potassium, ammonium, and amines. A two step process may be used, in which the sodium cations first are at least partially replaced with hydrogen cations by passing an aqueous solution of the dye through the hydrogen form of a strong acid ion exchange resin, and the hydrogen cations subsequently are at least partially replaced with the preselectd cations by neutralizing the hydrogen-containing dye solution with a base which contains the preselected cation species. Alternatively, a one step process, comprising passing the aqueous solution of the dye through an ion exchange resin pre-loaded with the preselected cations, may be employed.

U.S. Pat. No. 5,026,425 (Hindagolla et al.), the disclosure of which is totally incorporated herein by reference, discloses inks for ink jet printing containing Direct Black 168 dye which have improved water resistance when the sodium cations on the dye are replaced with cations selected from the group consisting of ammonium, polyfunctional amines, and volatile amines.

U.S. Pat. No. 5,342,439 (Lauw), the disclosure of which is totally incorporated herein by reference, discloses the alleviation of color bleed on paper media by ink jet by altering the dyes such that they become more bleed resistant. An organic compound with surfactant properties is substituted as the dye counterion. Specifically, a dye having one or more sulfonate or carboxylate groups is provided with a counterion comprising an amine having the formula

wherein m ranges from 1 to 3, n ranges from 3 to 6, and R is a hydrophilic substituent or cycloaliphatic or aromatic group with a hydrophilic substituent. An ink employing the dye comprises (a) about 0.5 to 40 weight percent of one or more low vapor pressure solvents, (b) about 0.5 to 5 weight percent of one or more water soluble dyes in which one or more of the counterions have been substituted with tne above amine, and (c) water.

Copending application U.S. Ser. No. 08/961,335, filed concurrently herewith, entitled "Improved Ink Compositions for Thermal Ink Jet Printing," with the named inventors Kurt B. Gundlach, Richard L. Colt, and Edward J. Radigan, Jr., the disclosure of which is totally incorporated herein by reference, discloses an ink composition which comprises water, a colorant, betaine, a tertiary amine, and a material of the formiula $[(F_{2n+1}C_nCH_2S)_2(CH_3)C-CH_2CH_2COO-][B+]$, wherein n is an integer of from about 8 to about 20 and B is a cation. In one specific embodiment, n is 10 and B is $(HO-CH_2CH_2)_2NH_{3+}$. In another specific embodiment, the tertiary amine is 1-methylimidozole. In yet another specific embodiment of the present invention, the colorant is an anionic dye with carboxylate groups, sulfonate groups, or both carboxylate and sulfonate groups. Also disclosed is a process for preparing the aforementioned ink composition wherein a liquid containing the material of the formula $[(F_{2n+1}C_nCH_2S)_2(CH_3)C-CH_2CH_2COO-][B^+]$ is subjected to centrifugation. Also disclosed are ink jet printing processes employing the aforementioned ink.

Copending application U.S. Ser. No. 08/961,435, filed concurrently herewith, entitled "Improved Ink Compositions for Thermal Ink Jet Printing," with the named inventors Kurt B. Gundlach, Luis A. Sanchez, Cheryl A. Hanzlik, Kathy-Jo Brodsky, Richard L. Colt, Aileen M. Montes, and Edward J. Radigan, Jr., the disclosure of which is totally incorporated herein by reference, discloses an ink composition which comprises (a) water, (b) a colorant, (c) a fluorinated material selected from: (1) those of the formula $[(F_{2n+1}C_nCH_2S)_2(CH_3)C-CH_2CH_2COO-][B+]$, wherein n is an integer of from about 8 to about 20 and B is a cation, (2) those of the formula $[(F_3C(F_2C)_nCH=CHCH_2OCH(OH)CH_2NCH_2COO-][X+]$, wherein X is a cation and n is an integer of from about 3 to about 20, and (3) mixtures thereof, and (d) a monomeric compound having at least two carboxylic acid functional groups. Also disclosed is a process for preparing said ink composition which comprises (i) admixing the ink ingredients, and (ii) subjecting the mixture thus formed to ultrasonification, thereby reducing the average particle diameter of liposomes of the fluorinated material in the ink. Further disclosed is, a process which entails (i) incorporating into an ink jet printing apparatus the aforementioned ink composition, and (ii) causing droplets of the ink composition to be ejected in an imagewise pattern onto a substrate. In a preferred embodiment, the printing apparatus employs a thermal ink jet process wherein the ink in the nozzles is selectively heated in an imagewise pattern, thereby causing droplets of the ink to be ejected in imagewise pattern.

Copending application U.S. Ser. No. 08/961,118, filed concurrently herewith, entitled "Improved Ink Compositions for Thermal Ink Jet Printing," with the named inventors Kurt B. Gundlach, Luis A. Sanchez, Cheryl A. Hanzlik, Kathy-Jo Brodsky, Richard L. Colt, Aileen M. Montes, Danielle Avolio, and Rachael L. McGrath, the disclosure of which is totally incorporated herein by reference, discloses an ink composition which comprises (a) water, (b) a colorant, and (c) a material of the formula $[(F_3C)(F_2C)_nCH=CHCH_2OCH(OH)CH_2)_2NCH_2COO-][X+]$, wherein X is a cation and n is an integer of from about 3 to about 20. Also disclosed are processes for preparing the ink composition and ink jet printing processes with the ink composition.

Copending application U.S. Ser. No. 08/961,461, filed concurrently herewith, entitled "Improved Ink Compositions for Thermal Ink Jet Printing," with the named inventors Kurt B. Gundlach and Walter F. Wafler, the disclosure of which is totally incorporated herein by reference, discloses an ink composition which comprises water, a colorant, a nonionic surfactant, and a fluorinated material selected from the group consisting of (a) those of the formula $[(F_{2n+1}C_nCH_2S)_2(CH_3)C-CH_2CH_2COO-][B+]$, wherein n is an integer of from about 8 to about 20 and B is a cation, and (b) those of the formula $[(F_3C(F_2C)_nCH=CHCH_2OCH(OH)CH_2)_2NCH_2COO-][X+]$, wherein X is a cation. Also disclosed are ink jet printing processes employing the aforementioned ink.

Copending application U.S. Ser. No. 08/961,173, filed concurrently herewith, entitled "improved Ink Compositions for Thermal Ink Jet Printing," with the named inventors Kurt B. Gundlach, Luis A. Sanchez, Richard L. Colt, and Rachael L. McGrath, the disclosure of which is totally incorporated herein by reference, discloses an ink composition which comprises water, a colorant, a bisquaternary ammonium compound, and a material of the formula $[(F_3C(F_2C)_nCH=CHCH_2OCH(OH)CH_2)_2NCH_2COO-][X+]$, wherein X is a cation and n is an integer of from about 3 to about 20. Also disclosed are ink jet printing processes employing the aforementioned ink.

Copending application U.S. Ser. No. 08/961,393, filed concurrently herewith, entitled "Improved Ink Compositions for Thermal Ink Jet Printing," with the named inventors Kurt B. Gundlach, Richard L. Colt, Luis A. Sanchez, and Danielle Avolio, the disclosure of which is totally incorporated herein by reference, discloses an ink composition which comprises water, a colorant, 1,4-diazabicyclo (2.2.2)octane, and a fluorinated material selected from the group consisting of (a) those of the formula $[(F_{2n+1}C_nCH_2S)_2(CH_3)C-CH_2CH_2COO-][B+]$, wherein n is an integer of from about 8 to about 20 and B is a cation, and (b) those of the formula $[(F_3C(F_2C)_nCH=CHCH_2OCH(OH)CH_2)_2NCH_2COO-][X+]$, wherein X is a cation and n is an integer of from about 3 to about 20. Also disclosed are processes for preparing the aforementioned ink and ink jet printing processes employing the aforementioned ink.

Copending application U.S. Ser. No. 08/960,991, filed concurrently herewith, entitled "Improved Ink Compositions for Thermal Ink Jet Printing," with the named inventors Kurt B. Gundlach, Luis A. Sanchez, and Richard L. Colt, the disclosure of which is totally incorporated herein by reference, discloses an ink composition which comprises water, a dye selected from the group consisting of Direct Blue 199, Direct Yellow 132, Acid Yellow 17, Reactive Red 180, Acid Red 52, and mixtures thereof, and a material of the formula $[(F_3C(F_2C)_nCH=CHCH_2OCH(OH)CH_2)_2NCH_2COO-][X+]$, wherein X is a cation and n is an integer of from about 3 to about 20, wherein the ink is substantially free of imidazole. Also disclosed are ink jet printing processes employing the aforementioned ink.

Copending application U.S. Ser. No. 08/960,792, filed concurrently herewith, entitled "Improved Ink Compositions for Thermal Ink Jet Printings, " with the named inventors Kurt B. Gundlach, Luis A. Sanchez, Richard L. Colt, and Danielle Avolio, the disclosure of which is totally incorporated herein by reference, discloses an ink composition which comprises (a) water, (b) a colorant selected from the group consisting of Acid Yellow 23, Acid Yellow 17, Reactive Red 180, Direct Blue 199, Acid Blue 9, and mixtures thereof, (c) imidazole, (d) an additive selected from the group consisting of betaine, polyethylene oxide, and mixtures thereof, and (e) a material of the formula $[(F_3C(F_2C)_nCH=CHCH_2OCH(OH)CH_2)_2NCH_2COO-][X+]$, wherein X is a cation and n is an integer of from about 3 to about 20. Also disclosed are ink jet printing processes employing the aforementioned ink.

Copending application U.S. Ser. No. 08/961,334, filed concurrently herewith, entitled "Improved Ink Compositions for Thermal Ink Jet Printing, " with the named inventors Kurt B. Gundlach, Luis A. Sanchez, Danielle Avolio, Maura A. Sweeney, and Richard L. Colt, the disclosure of which is totally incorporated herein by reference, discloses an ink composition which comprises (1) water, (2) a colorant, (3) a material of the formuia $[(F_3C(F_2C)_nCH=CHCH_2OCH(OH)CH_2)_2NCH_2COO-][X+]$, wherein X is a cation and n is an integer of from about 3 to about 20, (4) a polymer selected from the group consisting of (a) tetrafunctional block copolymers derived from the addition of propylene oxide and ethylene oxide to ethylenediamine; (b) polyethylene oxide-polypropylene oxide-polyethylene oxide triblock copolymers; (c) polypropylene oxide-polyethylene oxide-polypropylene oxide triblock copolymers; (d) ethoxylated 2-naphthol polymers; and (e) mixtures thereof, and (5) an additive selected from the group consisting of (i diethylene glycol; (ii) glycerol; (iii) trimethylol propane; (iv) urea; (v) n-methyl pyrrolidone; (vi) sulfolane; (vii) 1,4 diazabicyclo(2.2.2)octane; (viii cyclohexylpyrrolidone; and (ix) mixtures thereof. Also disclosed are ink jet printing processes employing the aforementioned ink.

While known compositions and processes are suitable for their intended purposes, a need remains for ink compositions with improved characteristics. In addition, a need remains for ink compositions which exhibit improved shelf stability. Further, a need remains for ink compositions which enable printing of images with sharp edges. Additionally, a need remains for ink compositions which enable printing of two or more adjacent color areas with reduced or no intercolor bleed. There is also a need for ink compositions with improved freeze/thaw stability. In addition, there is a need for ink compositions with improved color gamut. Further, there is a need for ink compositions which exhibit reduced showthrough when printed on paper substrates. Additionally, there is a need for ink compositions having dye colorants which exhibit reduced intercolor bleed with ink compositions having pigment colorants, whether or not the pigmented ink compositions contain a fluorinated material.

SUMMARY OF THE INVENTION

It is an object of the present invention to provide ink compositions with the above noted advantages.

It is another object of the present invention to provide ink compositions with improved characteristics.

It is yet another object of the present invention to provide ink compositions which exhibit improved shelf stability.

It is still another object of the present invention to provide ink compositions which enable printing of images with sharp edges.

Another object of the present invention is to provide ink compositions which enable printing of two or more adjacent color areas with reduced or no intercolor bleed.

Yet another object of the present invention is to provide ink compositions with improved freeze/thaw stability.

Still another object of the present invention is to provide ink compositions with improved color gamut.

It is another object of the present invention to provide ink compositions which exhibit reduced showthrough when printed on paper substrates.

It is yet another object of the present invention to provide ink compositions having dye colorants which exhibit reduced intercolcor bleed with ink compositions having pigment colorants, whether or not the pigmented ink compositions contain a fluorinated material.

These and other objects of the present invention (or specific embodiments thereof) can be achieved by providing an ink composition which comprises water, an anionic dye having at least one anionic functional group and having a cationic counterion associated with each anionic functional group, and a material of the formula [($F_{2n+1}C_nCH_2S$)$_2$($CH_3$)C—$CH_2CH_2COO$—][B+], wherein n is an integer of from about 8 to about 20 and B is a cation, said ink composition containing alkali metal cations in an amount of no more than about $1\times10^{-3}$ moles per liter.

DETAILED DESCRIPTION OF THE INVENTION

Inks of the present invention contain an aqueous liquid vehicle, an anionic dye having at least one anionic functional group and having a cationic counterion associated with each anionic functional group, and a material of the formula [($F_{2n+1}C_nCH_2S$)$_2$($CH_3$)C—$CH_2CH_2COO$—][B+], wherein n is an integer of from about 8 to about 20 and B is a cation, said ink composition containing alkali metal cations in an amount of no more than about b $1\times10^{-3}$ moles per liter. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, tripropylene glycol monomethyl ether, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount of from about 60 to about 95 percent by weight of the ink, and preferably from about 70 to about 90 percent by weight of the ink, although the amount can be outside these ranges.

Also contained in the ink is a material of the formula

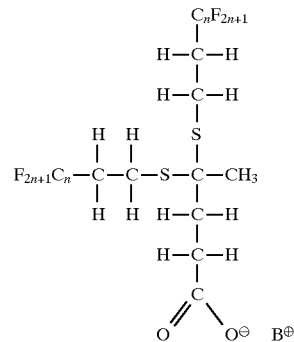

wherein n is an integer of from about 8 to about 20 and B is a cation. In one specific embodiment, n is 10 and B is (HO—$CH_2CH_2$)$_2$$NH_2$+. Other examples of suitable cations include ammonium, (HO—$CH_2CH_2$)$_3$NH+, (HO—$CH_2CH_2$)$NH_3$+, an imidazolium cation such as imidazolium, N-methyl imidazolium, or N-butyl imidazolium, trishydroxymethyl)aminomethane hydrochloride, tris(hydroxymethyl)aminomethane hydrocitrate, protonated 1,4-diazabicyclo(2.2.2)octane, and the like. Materials of this formula are available from, for example, Ciba-Geigy, Ardsley, N.Y. (Greensboro, N.C.) as LODYNE P-201. The fluorinated material of the above formula is present in the ink in any effective or desired amount; typically, the amount ranges from about 0.1 to about 10 percent by weight of the ink, and preferably from about 0.5 to about 5 percent by weight of the ink, although the amount can be outside these ranges.

Also contained in the ink composition of the present invention is an anionic dye. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Moboy Chemical; Intrabond Uiquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the PROJET FAST 2 Series of dyes, available from Zeneca Colours, Dighton, Mass., such as PROJET FAST CYAN 2, PROJET FAST YELLOW 2, PROJET FAST MAGENTA 2, PROJET FAST BLACK 2, the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. Examples of preferred dyes for the inks of the present invention include the PROJET FAST 2 Series of dyes, available from Zeneca Colours, Dighton, Massachusetts, such as PROJET FAST CYAN 2, PROJET FAST YELLOW 2, PROJET FAST MAGENTA 2, PROJET FAST BLACK 2, and the like. Use of these dyes enables ink advantages such as improved thermal stability with respect to viscosity increase, reduced or no heater deposits after 1 million pulses, improved waterfastness, excellent color gamut, high optical density, and the ability to reduce the concentration of dye in the ink.

Anionic dyes typically are supplied in a form wherein the anionic groups are associated with cationic counterions which are alkali metal cations, such as Na+, Li+, K+, or the like. When anionic dyes having alkali metal cations as counterions are admixed with the fluorinated material present in the inks of the present invention, the fluorinated material and the dye tend to react to form a salt, thereby reducing the shelf life of the ink composition. Salt formation in turn results in the formation of biphase inks, and the top phase (which then constitutes the majority of the ink composition) exhibits increased undesirable intercolor bleed when the ink is printed next to an ink of different color on plain paper substrates. While not being limited to any particular theory, it is believed that replacement of the alkali metal counterions with nonmetallic counterions reduces salt formation, thereby enabling enhanced intercolor bleed control and increased shelf stability with the ink compositions of the present invention.

Any suitable or desired cationic counterions can be employed. One example of a suitable class of cationic counterions is that represented by the general formula

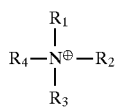

wherein each of $R_1$, $R_2$, $R_3$ and $R_4$, independently of the others, is hydrogen or an alkyl group (including cyclic alkyl groups, wherein the alkyl group can be substituted with, for example, hydroxy groups, halide groups, or the like), preferably with from 1 to about 10 carbon atoms and more preferably with from 1 to about 7 carbon atoms. This class of materials includes ammonia, protonated primary amines, protonated secondary amines, protonated tertiary amines, quaternary ammonium compounds, and the like.

Another example of a suitable class of cationic counterions is protonated polyfunctional amines, such as protonated ethylenediamine, protonated diethylenetriamine, protonated triethylenetetramine, protonated tetraethylenepentamine, protonated pentaethylenehexamine, protonated nitrilotrisethylamine, protonated N,N'-(diaminoethyl) piperazine, protonated piperazinylethylethylenediamine, protonated aminoethyltriethylenetetramine, protonated piperazinylethyidiethylenetriamine, protonated N,N'-bis(3-aminopropyl)ethylenediamine, protonated 1,4-bis(3-aminopropyl)piperazine, protonated N,N'-bis(3-aminopropyl)-1,3-propanediamine, protonated N,N'-bis(2-aminoethyl)-1,3-propanediamine protonated N,N'-bis(3-aminopropyl)1,4-butanediamine, and the like, as well as mixtures thereof.

Another example of a suitable class of cationic counterions is cationic amides, of the general formula

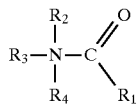

wherein $R_1$ is hydrogen, an alkyl group (including cyclic alkyl groups, wherein the alkyl group can be substituted with, for example, hydroxy groups, halide groups, or the like), preferably with from 1 to about 16 carbon atoms and more preferably with from 1 to about 10 carbon atoms, an amine group (including primary, secondary, tertiary, and quaternary amines), or an alkoxy group, preferably with from 1 to about 16 carbon atoms and more preferably with from 1 to about 10 carbon atoms, and each of $R_2$, $R_3$ and $R_4$, independently of the others, is hydrogen or an alkyl group (including cyclic alkyl groups, wherein the alkyl group can be substituted with, for example, hydroxy groups, halide groups, or the like), preferably with from 1 to about 16 carbon atoms and more preferably with from 1 to about 10 carbon atoms.

Specific examples of suitable cations include ammonium ($NH_4+$), methyl ammonium, dimethyl ammonium, tetramethyl ammonium, ethyl ammonium, diethyl ammonium, β-hydroxyethyl trimethylammonium (choline cation, $(CH_3)_3NCH_2OH+$), trimethanol ammonium, monoethanol ammonium, diethanol ammonium, triethanol ammonium, protonated dimethylaminopropylamine, and the like.

Any other suitable non-alkali-metal counterions can also be employed.

When the anionic dye is obtained from the supplier with alkali metal counterions, the alkali metal counterions can be replaced with nonmetallic counterions by any suitable or desired process. For example, cation substitution can be accomplished by reverse osmosis. Cation substitution can also be accomplished by ion exchange, in either a two step process, wherein the dye having alkali metal counterions associated therewith is first passed through an acid-loaded ion exchange resin, followed by reaction of the acid form of the dye with the cation as an aqueous solution containing [C]+[OH]−, wherein C+ is the desired cation, or in a one step process, wherein the dye having alkali metal counterions associated therewith is passed through an ion exchange resin loaded with the desired counterions. Reverse osmosis and ion exchange methods for exchanging dye cations are disclosed in, for example, U.S. Pat. No. 4,761,180, U.S. Pat. No. 4,786,327, U.S. Pat. No. 4,810,292, U.S. Pat. No. 5,026,425, and U.S. Pat. No. 5,342,439, the disclosures of each of which are totally incorporated herein by reference. Any other desired or suitable methods for exchanging cations can also be employed. For example, the dye having alkali metal cations can be converted to the acid form of the dye, followed by neutralization with the desired base (such as the hydroxide of the desired cation, an amine which, upon reacting with the acid form of the dye, becomes converted to the desired cation, or the like), or the like.

Preferably, no alkali metal cations are present in the inks of the present invention. When dyes are obtained from the suppliers with alkali metal counterions and these counterions are subsequently exchanged for nonmetallic counterions, typically the inks of the present contain alkali metal cations in an amount of no more than about $1\times10^{-3}$ moles per liter, preferably no more than about $1\times10^{-4}$ moles per liter, and more preferably no more than about $1\times10^{-5}$ moles per liter.

The dye is present in the ink composition in any effective amount, typically from about 0.5 to about 15 percent by weight of the ink, and preferably from about 1 to about 10 percent by weight of the ink, although the amount can be outside of these ranges.

Optionally, betaine can also be present in the inks of the present invention. Betaine is commercially available from, for example, Finnsugar Biomedical, Helsinki, Finland. Betaine is present in the ink in any effective or desired amount; typically, the amount ranges from about 5 to about 25 percent by weight of the ink, and preferably from about 10 to about 20 percent by weight of the ink, although the amount can be outside these ranges.

Optionally, a tertiary amine can also be present in the iinks of the present invention. Suitable tertiary amines include those of the formula

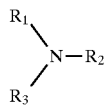

wherein $R_1$, $R_2$, and $R_3$ each, independently of the others, is an alkyl group (including saturated, unsaturated, and cyclic alkyl groups), preferably with from 1 to about 10 carbon atoms, more preferably with from 1 to about 4 carbon atoms, a substituted alkyl group, preferably with from 1 to about 4 carbon atoms, more preferably with from 1 to about 2 carbon atoms, wherein the substituents can be hydroxy groups, alkoxy groups, preferably wherein the alkyl portion of the alkoxy group contains from 1 to about 4 carbon atoms and more preferably from 1 to about 2 carbon atoms, or the like, and wherein two or more of $R_1$, $R_2$, and $R_3$ can be joined together to form a ring. Examples of suitable tertiary amines for the inks of the present invention include triethanolamine, tris[2-(2-methoxyethoxy)ethyl]amine, imidazole, N-butyl imidazole, diethanolamine, and the like. In a specific embodiment of the present invention, the tertiary amine is 1-methylimidazole, of the formula

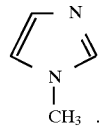

In general, it is believed that lower basicity of the tertiary amine leads to lower pH values at which ink stability and viscosity stability can be achieved; for example, the presence of an amine such as $N(OCH_2CH_3)_3$ enables ink viscosity stability at pH values of about 9.5 or greater, whereas the presence of an amine such as 1-methylimidazole enables ink viscosity stability at pH values of about 8.5 or greater. The tertiary amine is present in the ink in any effective or desired amount; typically, the amount ranges from about 1 to about 25 percent by weight of the ink, and preferably from about 3 to about 20 percent by weight of the ink, although the amount can be outside these ranges. The presence of the tertiary amine in the ink in combination with betaine and the material of the formula $[(F_{2n+1}C_nCH_2S)_2(CH_3)C-CH_2CH_2COO-][B+]$ enables advantages such as improved homogeneity, improved 1.2 micron filterability, and thermal stability with respect to viscosity increase. In addition, the basicity of the tertiary amine is reduced when electron withdrawing groups are present, shifting the pH at which amine protonation occurs toward neutrality. For example, thermal stability of inks containing triethanol amine in an amount of from about one to about three times the amount of the material of the formula $[(F_{2n+1}C_nCH_2S)_2(CH_3)C-CH_2CH_2COO-][B+]$ in the ink was observed at a pH of over about 8.5. Thermal stability of inks containing the more basic tris[2-(2-methoxyethoxy)ethyl]amine in an amount of from about one, to about three times the amount of the material of the formula $[(F_{2n+1}C_nCH_2S)_2(CH_3)C-CH_2CH_2COO-][B+]$ in the ink was observed at a pH of over about 9.0. Thermal stability of inks containing the highly basic triethyl amine in an amount of from about one to about three times the amount of the material of the formula $[(F_{2n+1}C_nCH_2S)_2(CH_3)C-CH_2CH_2COO-][B+]$ in the ink was observed at a pH of about 10.5 or more. Thermal stability of inks containing 1-methylimidazole (which is less basic than triethanolamine as a result of lone electron pair conjugation with the aromatic ring) in an amount of from about one to about three times the amount of the material of the formula $[(F_{2n+1}C_nCH_2S)_2(CH_3)C-CH_2CH_2COO-][B+]$ in the ink was observed at a pH of about 8.0 or more, and in some instances at a pH of about 7.6 or more. Inks containing 1-methylimidazole also exhibited advantages such as reduced or no ink deposits on the printhead heaters after $1\times10^7$ pulses and kogation-free performance in thermal ink jet printers. These inks also exhibited microscopic phase separation (i.e., formation of liposomes) under jetting conditions, which, it is believed, resulted in a significantly reduced surface area to mass ratio that reduced contact with the printer heater surface and thus reduced kogation. The inks also exhibited no macroscopic phase separation (which is undesirable) when maintained at pH conditions of about 7.6 or higher and heated to about 60° C. Any suitable or desired acid can be employed to adjust the pH of the ink to the desired level, such as hydrochloric acid, formic acid, phosphorous acid, or the like, with monomeric compound having at least two carboxylic acid functional groups, such as ethylenediamine tetroacetic acid, aspartic acid, citric acid, malic acid, glutaric acid, adipic acid, oxalic acid, malonic acid, maleic acid, alpha keto glutaric acid, and the like, being preferred.

Optionally, a monomeric compound having at least two carboxylic acid functional groups is also contained in the inks of the present invention. Examples of suitable multifunctional acids include ethylenediamine tetraacetic acid, aspartic acid, citric acid, malic acid, glutaric acid, adipic acid, oxalic acid, malonic acid, maleic acid, alpha keto glutaric acid, and the like. The multifunctional acid is present in the ink in any effective or desired amount, typically from about 0.05 to about 5 percent by weight of the ink, preferably from about 0.2 to about 3 percent by weight of the ink and more preferably from about 1 to about 2 percent by weight of the ink, although the amount can be outside these ranges. Additional examples of multifunctional acids include those disclosed in columns 19 to 22 of U.S. Pat. No. 5,589,277, the disclosure of which is totally incorporated herein by reference. While not being limited to any particular theory, it is believed that the presence of the multifunctional acid in combination with the fluorocarbon material enhances the shelf stability of the inks of the present invention. The fluorocarbon material in an ink in the absence of a multifunctional acid may exhibit a tendency to salt out of the ink, particularly when the colorant is an anionic dye. It is believed that hydrogen bonding occurs between the polar carboxyl groups of the fluorocarbon material and the carboxyl groups of the multifunctional acid, thereby stabilizing the liposome structure of the fluorocarbon material in the ink. The stabilized ink also exhibits improved jetting characteristics and improved viscosity stability with respect to pH and temperature. It is believed that the stabilized liposome structure renders the liposomes resistant to coalescence, thereby improving resistance to viscosity build.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

In one specific embodiment the ink contains a nonionic surfactant. Any suitable or desired nonionic surfactant may be employed. Examples of suitable nonionic surfactants include octylphenoxy polyethoxy ethanols, such as TRITON X-100, available from Union Carbide Co., Danbury, Conn., acetylenic diols such as 2,4,7,9-tetramethyl-5decyn-4,7-diol and the like, such as SURFYNOL GA and SURFYNOL CT-136, available from Air Products & Chemicals Co., Allentown, Pa., trimethyl nonylpolyethylene-glycol ethers, such as TERGITOL TMN-10 (containing 10 oxyethylene units, believed to be of the formula $C_{12}H_{25}O(C_2H_4O)_5H$), available from Union Carbide Co., Danbury, Conn., nonionic esters of ethylene oxide, such as MERPOL SH (believed to be of the formula $CH_3(CH_2)_{12}(OC_2H_4)_8OH$), available from E. I. Du Pont de Nemours & Co., Wilmington, Del., non-ionic esters of ethylene oxide and propylene oxide, such as MERPOL LFH (believed to be of the formula $CH_3(CH_2)_n(OC_2H_4)_8(OC_3H_6)_8OH$ where n is an integer from about 12 to about 16), available from E. I. Du Pont de Nemours & Co., Wilmington, Del., and the like, as well as mixtures thereof. The nonionic surfactant is present in the ink in any suitable or desired amount, typically from about 0.1 to about 5 percent by weight of the ink, and preferably from about 0.5 to about 2 percent by weight of the ink, although the amount can be outside of these ranges.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethylene oxide, block copolymers of polyethylene oxide and polypropylene oxide, polyvinylpyridine, polyethyleneimine, polyhydroxyethyl ethyleneimine, polyquaternary salts, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central bisphenol-A-type moiety. This additive is of the formula

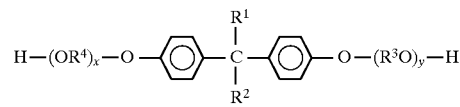

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions are generally of a viscosity suitable for use in thermal ink jet printing processes. At room temperature (i.e., about 25° C.), typically, the ink viscosity is no more than about 5 centipoise, and preferably is from about 1 to about 3 centipoise, although the viscosity can be outside this range.

Ink compositions of the present invention can be of any suitable or desired pH. For some embodiments, such as thermal ink jet printing processes, typical pH values are from about 8 to about 9.5, and preferably from about 8.0 to about 9.0, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients and filtering.

In one specific embodiment of the present invention, the material of the formula $[(F_{2n+1}C_nCH_2S)2(CH_3)C-CH_2CH_2COO-][B+]$ is purified prior to admixing it with the other ink ingredients. This material is frequently supplied in liquid form from the commercial supplier as ca colloidal suspension. Purification is accomplished by centrifugation of the liquid containing the material. The liquid can contain the material in any suitable or desired amount. Typically, the material of the formula $[(F2n+1C_nCH_2S)2(CH_3)C-CH_2CH_2COO-][B+]$ is present in the liquid in an amount of from about 20 to about 50 percent by weight, and preferably from about 25 to about 35 percent by weight, although the amount can be outside these ranges. To obtain these concentrations, typically a commercially supplied colloidal suspension is diluted by admixing one part by weight of the suspension with about 5 parts by weight of water. Subsequent to centrifugation, the clear supernale contains the purified material and the milky, flocculated bottom layer contains impurities. Typical centrifugation speeds are from about 1,000, to about 20,000 revolutions per minute, and preferably from about 5,000 to about 15,000 revolutions per minute, although the speed can be outside these ranges. Typical centrifugation times are from about 10 to about 60 minutes, and preferably from about 15 to about 30 minutes, although the time can be outside these ranges. In one specific example of this process, LODYNE P-201, which is sold as a solution of the material in water at a concentration of about 30 percent by weight solids, is further diluted by admixing one part by weight of the LODYNE P-201 solution and five parts by weight water. This mixture is then centrifuged at about 10,000 rpm for about 1 hour, thereby generating a supernate containing about 4.25 percent by weight of the solid material. Advantages of inks containing the purified material over inks containing the unpurified material include increased surface tension, improved 1.2 micron filterability, and improved thermal stability with respect to viscosity increase. The inks containing the purified material also exhibit good latency, jitter characteristics, drop size, and transit time.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A tetramethyl ammonium salt of Acid Yellow 23 dye was received from the manufacturer (Tricon Colors) with the sodium ions normally associated therewith having been replaced with tetramethytl ammonium counterions.

An ink composition was then prepared by simple mixing of the following ingredients:

| Ingredient | Supplier | Amount |
| --- | --- | --- |
| deionized water | — | 33.4 grams |
| tripropylene glycol monomethyl ether | Aldrich Chemical Co. | 20 grams |
| sulfolane (95% pure balance water) | Phillips | 31.4 grams |
| DOWICIL 150/200 biocide | Dow Chemical Co. | 0.2 gram |
| Acid Yellow 23 dye tetramethyl ammonium salt (8% by weight dye solids in aqueous solution) | Tricon Colors | 75 grams |
| LODYNE P-201 (10.87 wt. % solids in water) | Ciba-Geigy | 40 grams |

The ink thus prepared was filtered through a 0.45 micron 47 millimeter Memtec PPDISC-0.45-47-100 filter at 10 pounds per square inch over a period of 31 seconds. The resulting ink exhibited a viscosity of 2.56 centipoise at 25° C., a conductivity of 5.04 millimhos, a surface tension of 28.8 dynes per centimeter, and a pH of 8.93 at 24° C.

The ink thus prepared was subjected to centrifugation at 1,000 revolutions per minute for a period of five minutes, after which the ink remained homogeneous and exhibited no phase separation.

For comparative purposes, an ink of identical composition was also prepared except that the Acid Yellow 23 dye had sodium counterions associated therewith, which sodium ions were present in the ink in a concentration of about $1\times10^{-2}$ moles per liter. The ink thus prepared was subjected to centrifugation at 1,000 revolutions per minute for a period of five minutes, after which the ink exhibited phase separation as a result of the "salting out" of the LODYNE P-201 sodium salt.

For further comparative purposes, to the stable homogeneous ink containing the tetramethylammonium dye wvas added an aqueous solution of sodium chloride. Addition of the sodium chloride solution caused destabilization of the ink, and phase separation was observed after centrifugation.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises water, an anionic dye having at least one anionic functional group and having a cationic counterion associated with each anionic functional group, and a material of the formula $[(F_{2n+1}C_nCH_2S)_2(CH_3)C—CH_2CH_2COO-][B+]$, wherein n is an integer of from about 8 to about 20 and B is a catioin, said ink composition containing alkali metal cations in an amount of no more than about $1\times10^{-3}$ moles per liter.

2. An ink composition according to claim 1 wherein at least some of the cationic counterions are selected from the group consisting of ammonia, protonated primary amines, protonated secondary amines, protonated tertiary amines, quaternary ammonium compounds, protonated polyfunctional amines, cationic amides, and mixtures thereof.

3. An ink composition according to claim 1 wherein at least some of the cationic counterions are selected from the group consisting of ammonium, methyl ammonium, dimethyl ammonium, tetramethyl ammonium, ethyl ammonium, diethyl ammonium, β-hydroxyethyl trimethylammonium, trimethanol ammonium, monoethanol ammonium, diethanol ammonium, triethonol ammonium, protonated dimethylaminopropylamine, and mixtures thereof.

4. An ink composition according to claim 1 wherein n is 10.

5. An ink composition according to claim 1 wherein B is $(HO—CH_2CH_2)_2NH_2+$.

6. An ink composition according to claim 1 wherein the material of the formula $[(F_{2n+1}C_nCH_2S)_2(CH_3)C—CH_2CH_2COO-][B+]$ is present in an amount of from about 0.1 to about 10 percent by weight of the ink.

7. An ink composition according to claim 1 wherein the ink composition contains alkali metal cations in an amount of no more than about $1\times10^{-4}$ moles per liter.

8. An ink composition according to claim 1 wherein the ink composition contains alkali metal cations in an amount of no more than about $1\times10^{-5}$ moles per liter.

9. A process which entails incorporating an ink according to claim 1 into an ink jet printing apparatus and causiing droplets of the ink composition to be ejected in an imagewise pattern onto a substrate.

10. A process according to claim 9 wherein the printing apparatus employs a thermal ink jet process wherein the ink in the nozzles is selectively heated in an imagewise pattern, thereby causing droplets of the ink to be ejected in imagewise pattern.

* * * * *